United States Patent
Dechene et al.

(10) Patent No.: US 7,202,576 B1
(45) Date of Patent: Apr. 10, 2007

(54) UNINTERRUPTIBLE POWER SUPPLY SYSTEMS AND ENCLOSURES

(75) Inventors: Joseph Dechene, Nashua, NH (US); Michael Manganese, Peabody, MA (US); Namwook Paik, Acton, MA (US); Andrew Chase, Boston, MA (US); Michael Lysik, Amesbury, MA (US)

(73) Assignee: American Power Conversion Corporation, West Kingston, RI (US)

( * ) Notice: Subject to any disclaimer, the term of this patent is extended or adjusted under 35 U.S.C. 154(b) by 557 days.

(21) Appl. No.: 10/690,726

(22) Filed: Oct. 22, 2003

Related U.S. Application Data

(60) Provisional application No. 60/508,702, filed on Oct. 3, 2003.

(51) Int. Cl.
*H02J 7/00* (2006.01)
*H02J 9/00* (2006.01)

(52) U.S. Cl. ..................... 307/66; 439/924.1
(58) Field of Classification Search ............ 439/924.1; 429/169, 179; 307/66
See application file for complete search history.

(56) References Cited

U.S. PATENT DOCUMENTS

| | | | | |
|---|---|---|---|---|
| 5,174,787 A | * | 12/1992 | Shirai et al. | ................. 439/489 |
| 5,216,371 A | * | 6/1993 | Nagai | ......................... 324/428 |
| 5,619,076 A | * | 4/1997 | Layden et al. | ................ 307/48 |
| 5,821,636 A | * | 10/1998 | Baker et al. | .................. 307/70 |
| 6,204,574 B1 | * | 3/2001 | Chi | .............................. 307/66 |
| 6,310,783 B1 | * | 10/2001 | Winch et al. | ............... 361/797 |

* cited by examiner

*Primary Examiner*—Brian Sircus
*Assistant Examiner*—Andrew Deschere
(74) *Attorney, Agent, or Firm*—Mintz, Levin, Cohn, Ferris, Glovsky and Popeo, P.C.

(57) ABSTRACT

One embodiment of the invention provides a UPS including a precharge circuit and a battery pack sensor electrically coupled to the precharge circuit. The sensor senses the presence of an extra battery pack. The precharge circuit includes: a first precharge contact; a capacitor having first and second leads, the first lead electrically coupled to the first contact; a second precharge contact electrically coupled to the second lead of the capacitor; a current limiting circuit having first and second leads, the first lead of the current limiting circuit electrically coupled to the first lead of the capacitor; and a third precharge contact electrically coupled to the second lead of the current limiting circuit. The UPS can further include an enclosure having a housing and a battery connector integral to the housing, the battery connector adapted to receive the first, second and third precharge contacts.

13 Claims, 8 Drawing Sheets

BATTERY FUSES NOT SHOWN FOR CLARITY

UNINTERRUPTIBLE POWER SUPPLY SYSTEMS AND ENCLOSURES

CROSS REFERENCE TO RELATED APPLICATION

This document claims priority to, and the benefit of the filing date of, copending provisional application entitled "Uninterruptible Power Supply Systems and Enclosures," assigned Ser. No. 60/508,702, filed Oct. 3, 2003, and incorporated herein by reference in its entirety. This document also claims priority to, and the benefit of the filing date of, copending application entitled "Enclosed Battery Assembly for an Uninterruptible Power Supply," assigned Ser. No. 09/811,856, filed Mar. 19, 2001, and incorporated herein by reference in its entirety. This document also claims priority to, and the benefit of the filing date of, copending application entitled "Integrated Uninterruptible Power Supply," assigned Ser. No. 09/778,446, filed Feb. 6, 2001, and incorporated herein by reference in its entirety.

BACKGROUND OF THE INVENTION

The present invention relates to uninterruptible power supply (UPS) systems and enclosures, and more particularly, to the connection between 1) internal battery or batteries (referred to as the battery cartridge) and/or external battery or batteries (referred to as the battery pack) and 2) the rest of a UPS system.

In conventional UPS systems, when a user connects a battery pack to the UPS, the user must typically handle two distinct parts, e.g., the battery pack connector attached to the battery pack and the associated UPS connector attached to the UPS. Handling two distinct parts typically requires the user to use two hands to make the connection. Moreover, the casing for the associated UPS connector is typically a separate part that the UPS manufacturer often has to order from a third party increasing cost and reducing control of the manufacturing process for the UPS manufacturer.

Furthermore, UPS battery connectors commonly exhibit deterioration of the battery connection terminals as a result of sparking at the connectors. The sparking is a result of incorporation of at least one large internal capacitor in the UPS. UPSs need a large internal capacitor for proper operation. In addition, current UPS systems using two pin connectors cannot easily detect the presence of an extra battery pack. Thus, a need exists for user-friendly and cost effective UPS systems and enclosures that incorporate a connector for internal batteries and/or external batteries and that provide the UPS manufacturer with greater control of the manufacturing process. A need also exists for UPS systems that can detect an extra battery pack.

SUMMARY OF THE INVENTION

The present invention relates to uninterruptible power supply (UPS) systems and enclosures, and more particularly, to the connection between 1) internal battery or batteries (referred to as the battery cartridge) and/or external battery or batteries (referred to as the battery pack) and 2) the rest of a UPS system. One embodiment of the invention provides a UPS including a precharge circuit and a battery pack sensor electrically coupled to the precharge circuit. The sensor senses the presence of an extra battery pack. The precharge circuit includes: a first precharge contact; a capacitor having first and second leads, the first lead electrically coupled to the first contact; a second precharge contact electrically coupled to the second lead of the capacitor; a current limiting circuit having first and second leads, the first lead of the current limiting circuit electrically coupled to the first lead of the capacitor; and a third precharge contact electrically coupled to the second lead of the current limiting circuit. The UPS can further include an enclosure having a housing and a battery connector integral to the housing, the battery connector adapted to receive the first, second and third precharge contacts.

The UPS can further include: a battery cartridge having a battery with positive and negative terminals, a first cartridge contact coupled to the positive terminal of the battery and adapted for mating with the first precharge contact, a second cartridge contact coupled to the negative terminal of the battery and adapted for mating with the second precharge contact, and a third cartridge contact electrically coupled to the first cartridge contact, the third cartridge contact adapted for mating with the third precharge contact, at least one of the first cartridge contact and the first precharge contact being recessed relative to the third cartridge contact and the third precharge contact, respectively, such that the capacitor is precharged through the third cartridge contact prior to full electrical contact between the first cartridge contact and the first precharge contact.

The battery pack sensor can include: a first sensor contact electrically coupled to the first precharge contact; a second sensor contact electrically coupled to the second precharge contact; a third sensor contact; and a sensing circuit electrically coupled to the third sensor contact and to the first sensor contact. The sensing circuit can include: a microprocessor having first and second pins, the microprocessor operative to sense the presence of a battery pack; a first resistor having first and second leads, the first lead electrically coupled to the first sensor contact and the second lead electrically coupled to the first microprocessor pin; a second resistor having first and second leads, the first lead electrically coupled to the first microprocessor pin and the second lead electrically coupled to the second sensor contact; a third resistor having first and second leads, the first lead electrically coupled to a voltage source and the second lead electrically coupled to the first microprocessor pin; a diode having an input lead and an output lead, the input lead electrically coupled to the first microprocessor pin; and a fourth resistor having first and second leads, the first lead electrically coupled to the output lead of the diode and the second lead electrically coupled to the third sensor contact.

The UPS can further include: a battery pack including a battery having a positive terminal and a negative terminal, a first pack contact electrically coupled to the battery positive terminal and adapted for mating with the first sensor contact, a second pack contact electrically coupled to the battery negative terminal and adapted for mating with the second sensor contact, a sense contact of the pack electrically coupled to the second pack contact and adapted for mating with the third sensor contact of the sensor. The sense contact of the pack can be electrically coupled to the second pack contact via a resistor.

BRIEF DESCRIPTION OF THE ILLUSTRATED EMBODIMENTS

Figure 1:
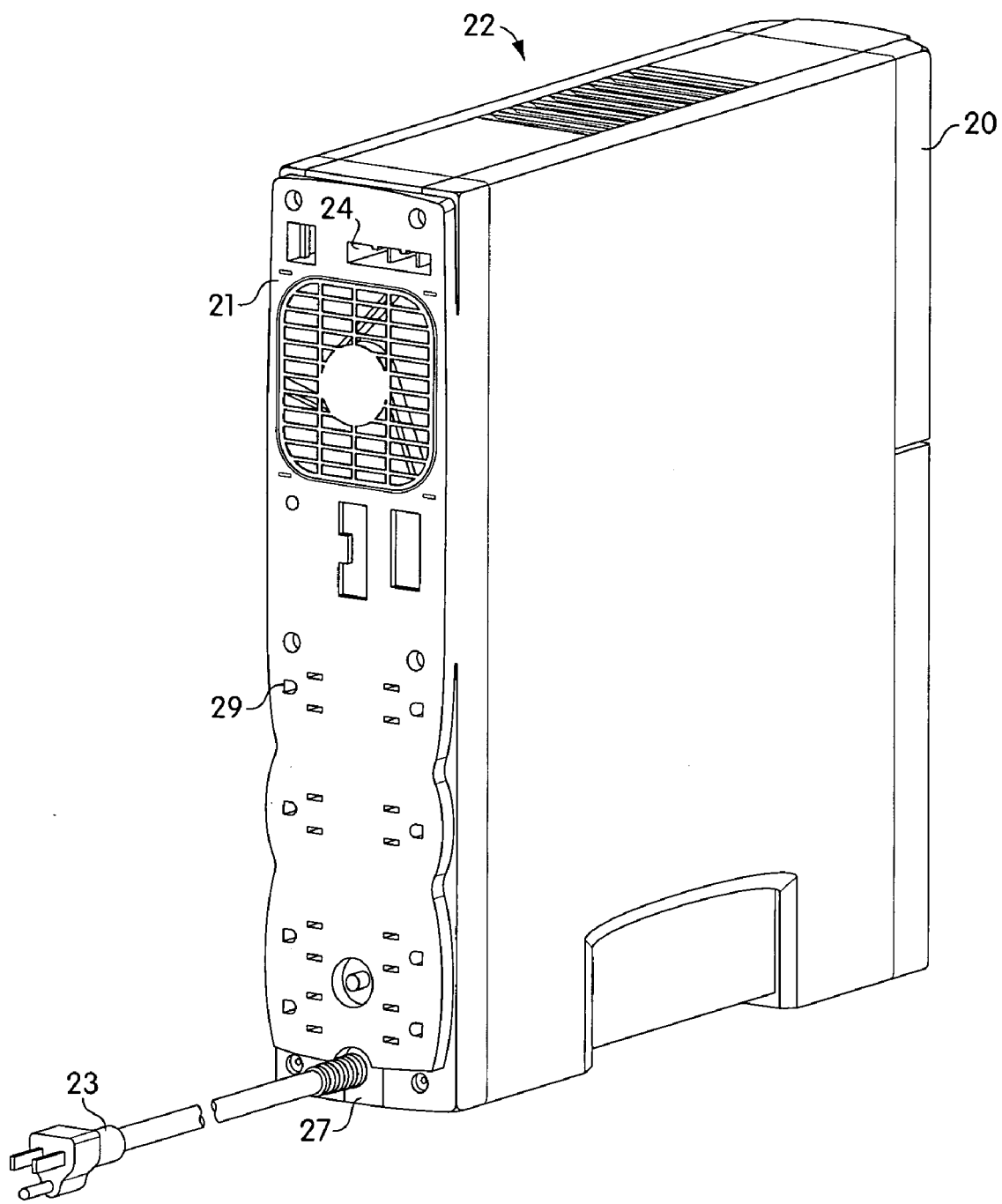
FIG. 1 is a perspective view of an uninterruptible power supply (UPS) showing the enclosure for the UPS including a battery connector.
Figure 5:
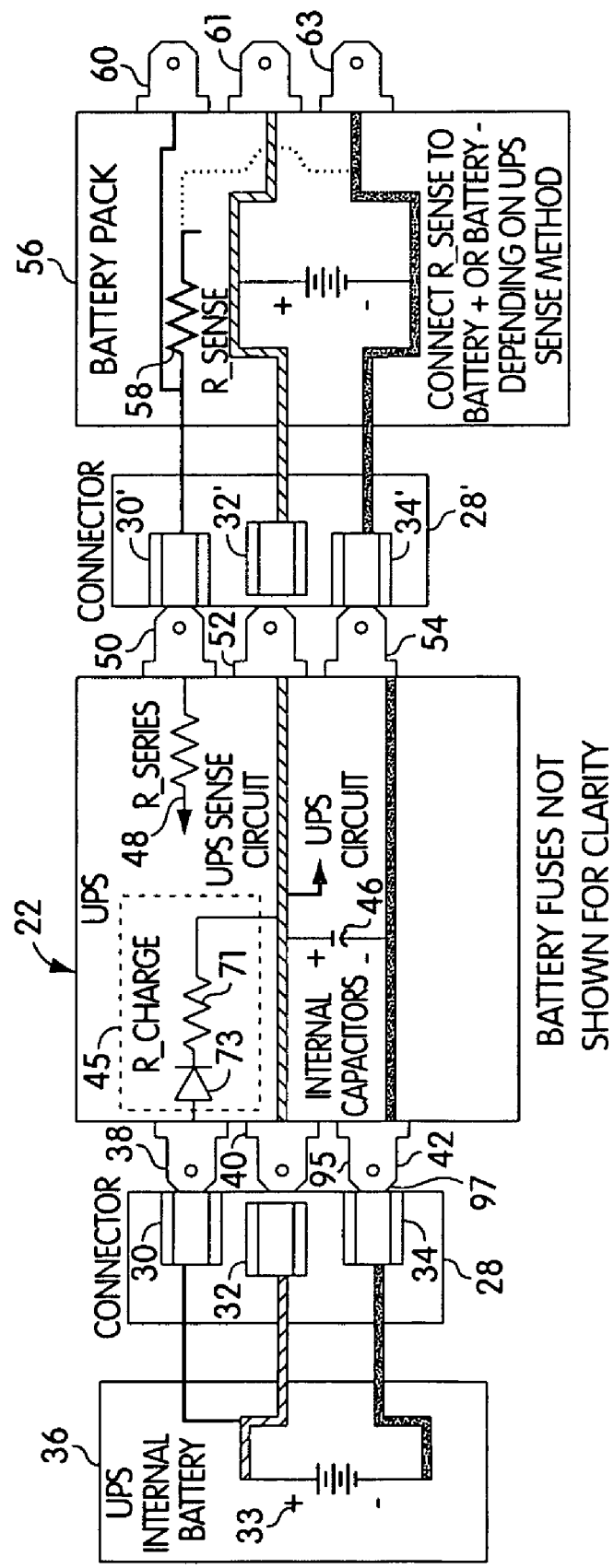
FIG. 5 is a schematic diagram of a system for achieving UPS capacitor precharge with extra battery pack sensing, where the system can use the connector of FIG. 1.
Figure 6:
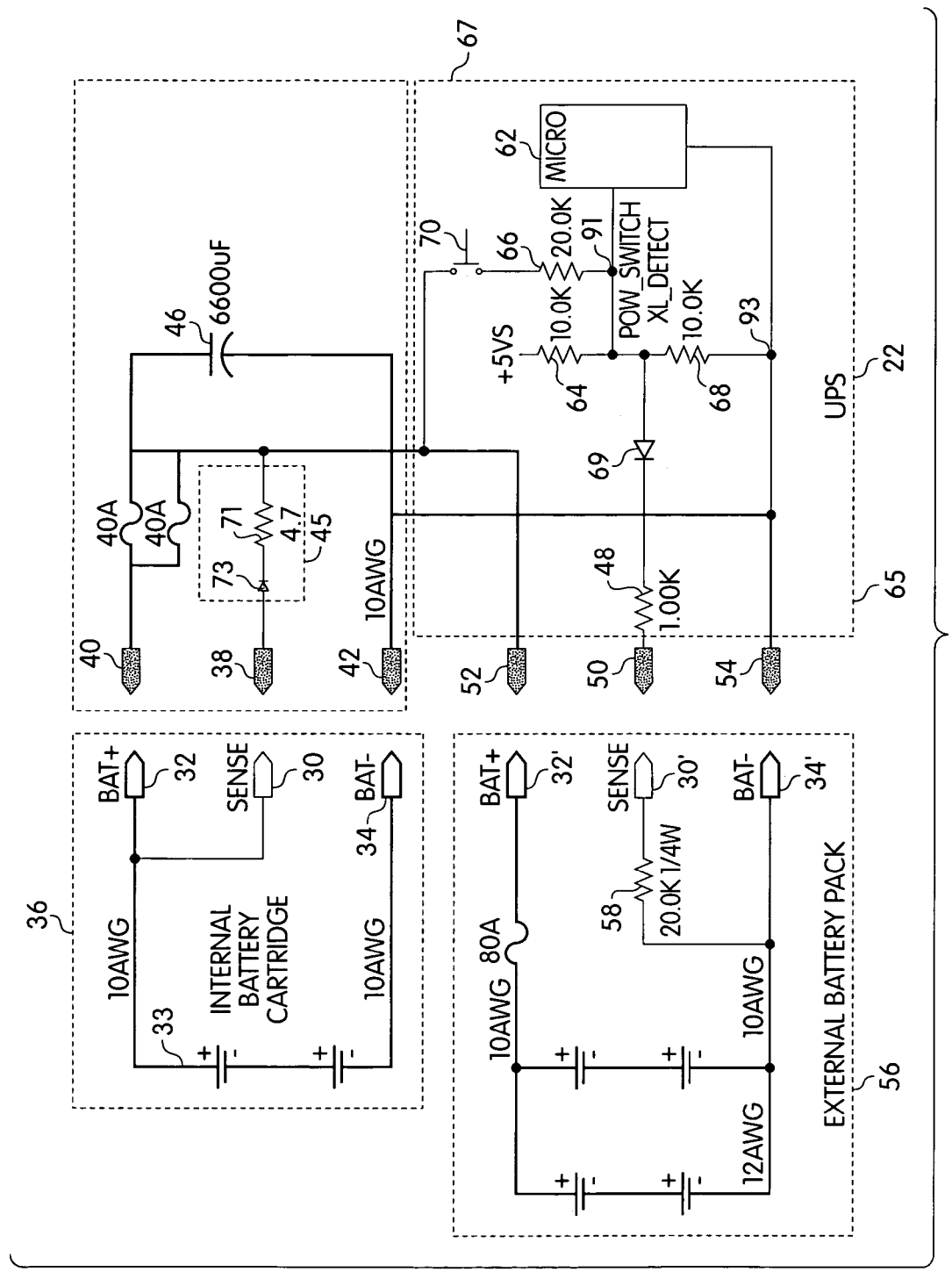
Figure 7:
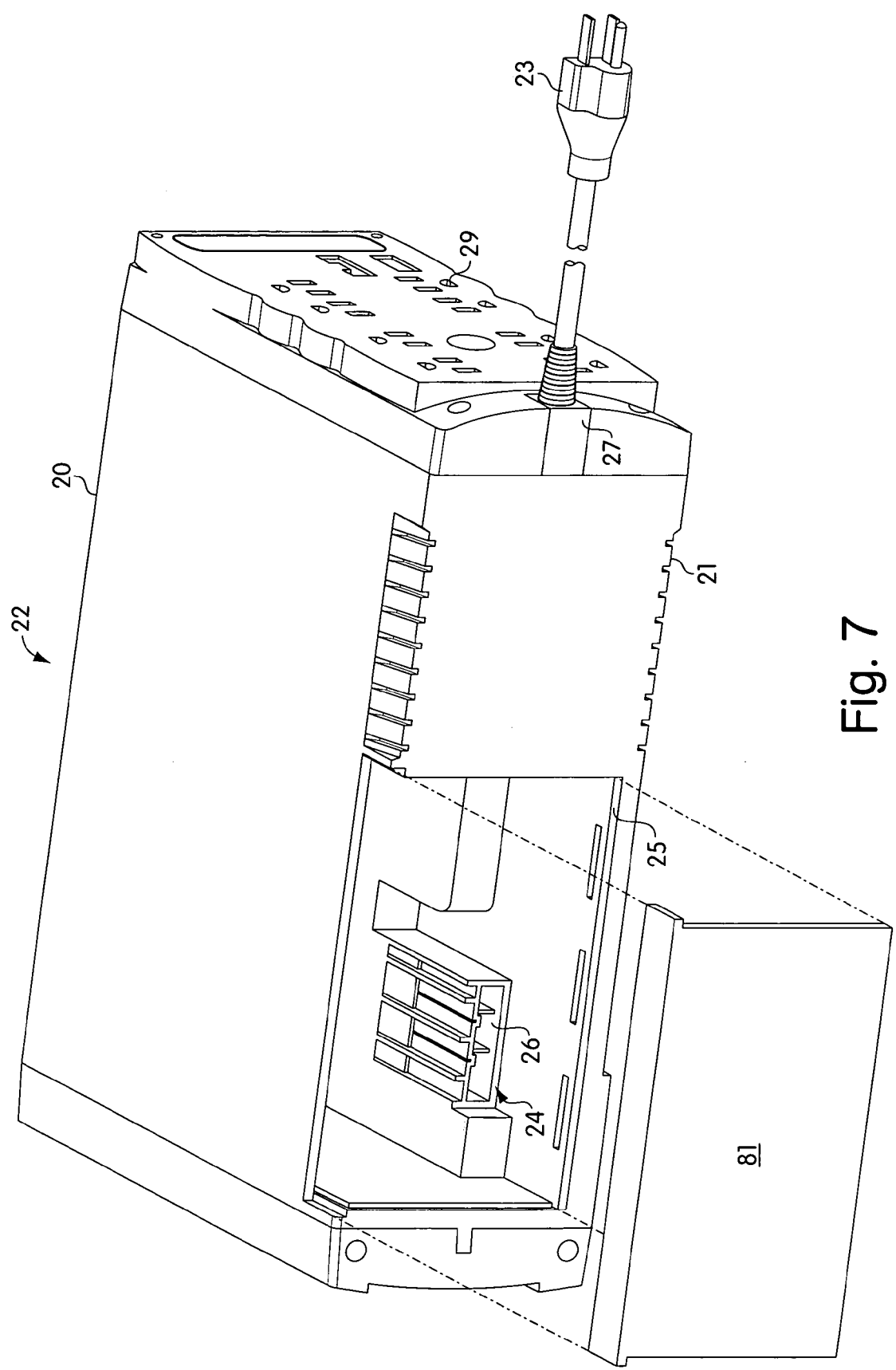
Figure 8:
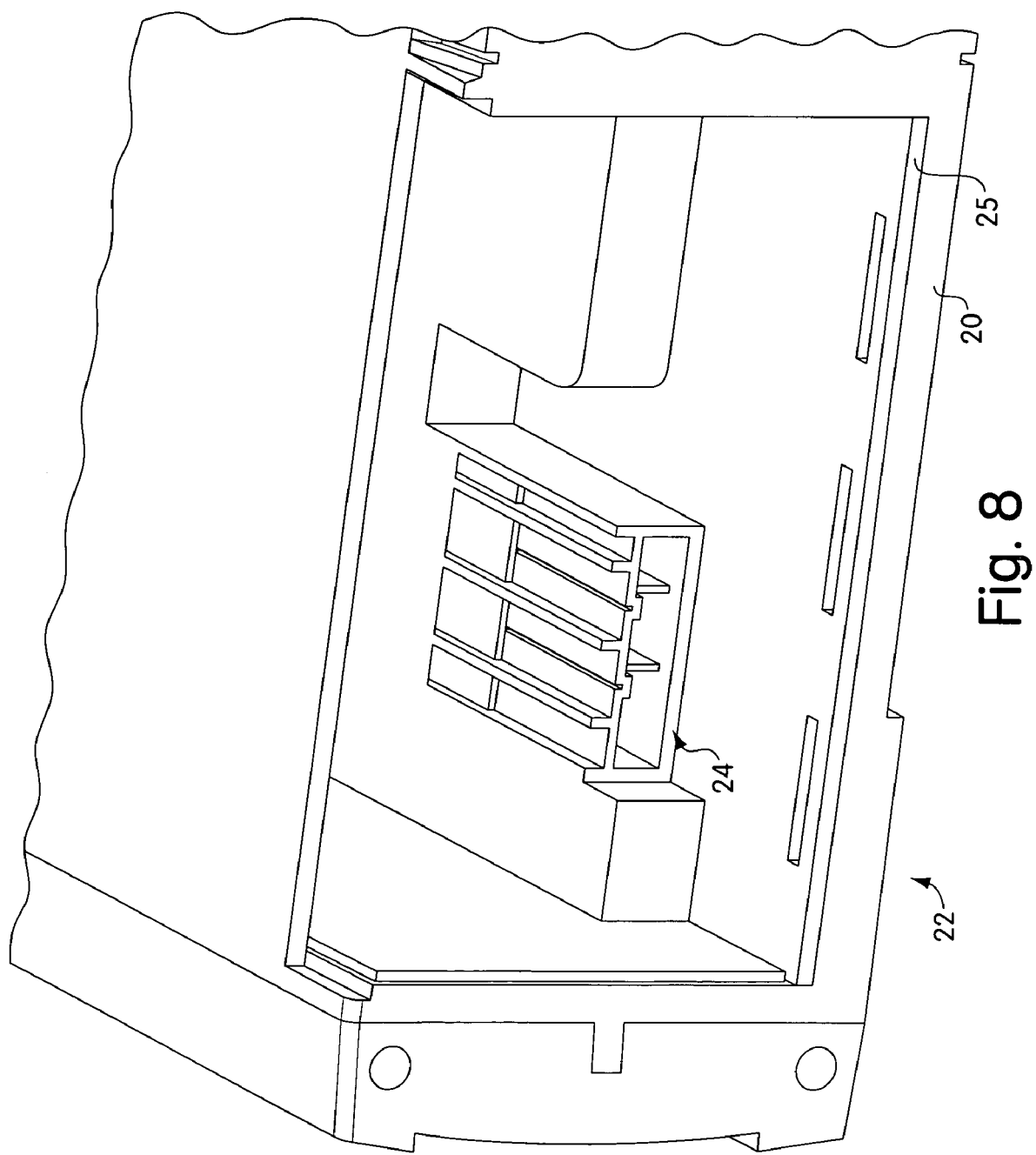

FIG. 6 schematic diagram of the system of FIG. 5 including a battery pack sensor;

FIG. 7 is a perspective view of an alternative embodiment of an enclosure for a UPS to that shown in FIG. 1;

FIG. 8 is another perspective view of the enclosure of FIG. 7; and

Figure 3:
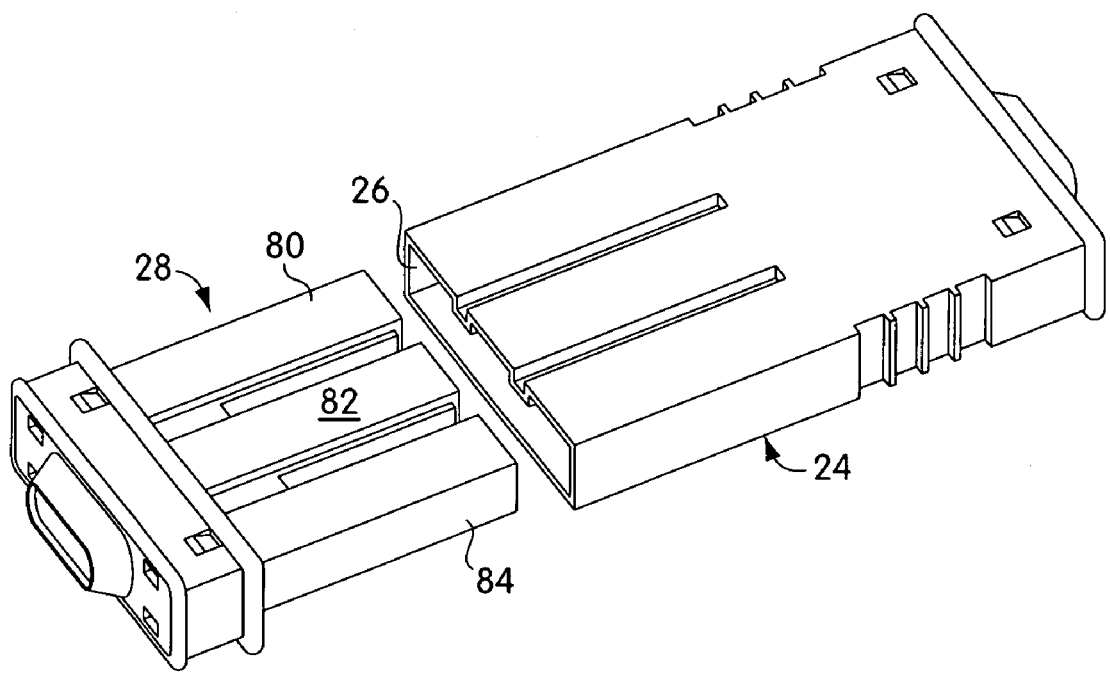
FIG. 3 is a perspective view of a male connector and a female connector associated with the battery connector of FIG. 1 where the male and female connectors are separated.
Figure 9:
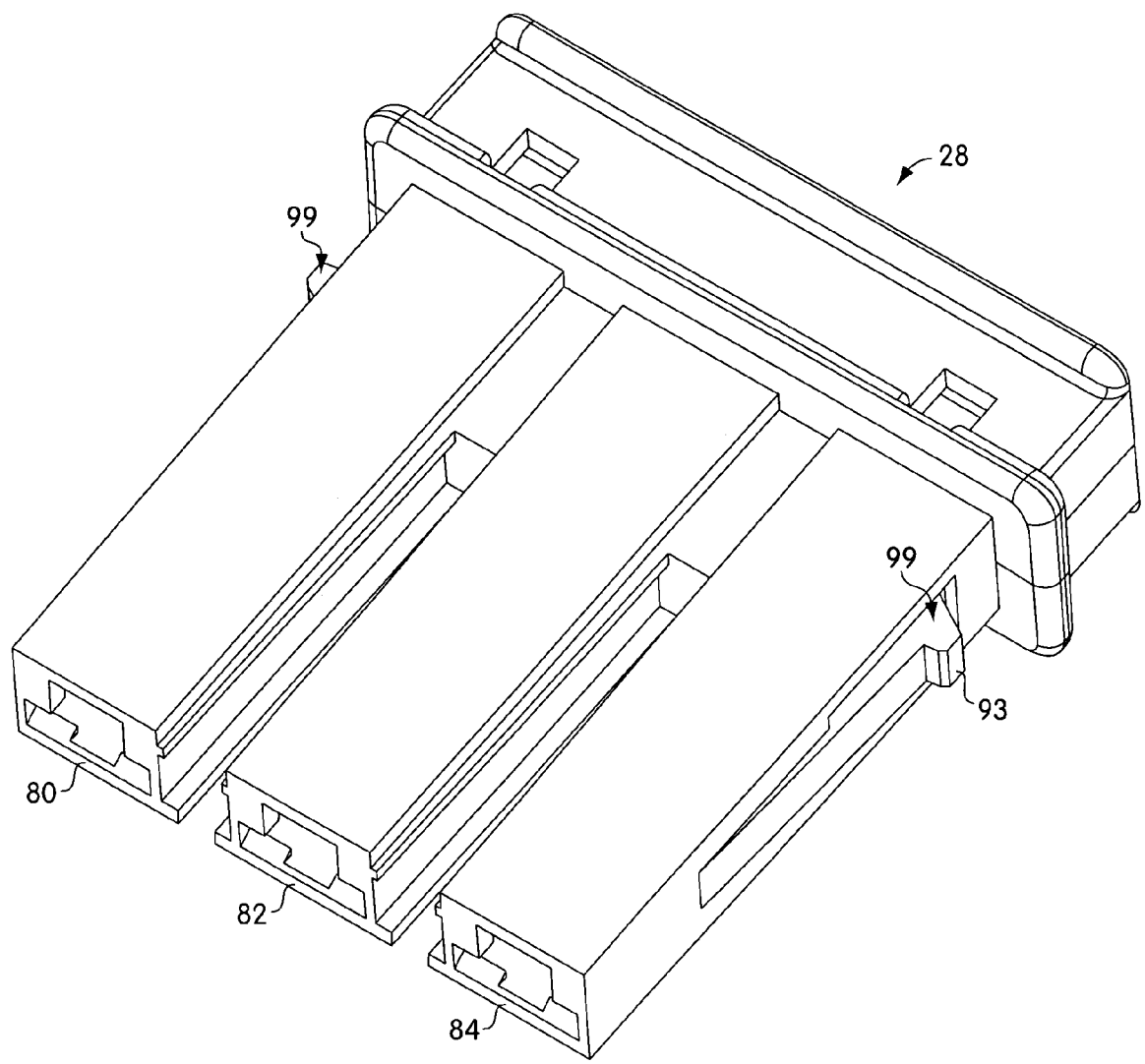

FIG. 9 is a perspective view of an embodiment of the male connector of FIG. 3.

DETAILED DESCRIPTION OF THE INVENTION

The present invention relates to uninterruptible power supply (UPS) systems and enclosures, and more particularly, to the connection between 1) internal battery or batteries (referred to as the battery cartridge) and/or external battery or batteries (referred to as the battery pack) and 2) the rest of a UPS system.

Figure 2:
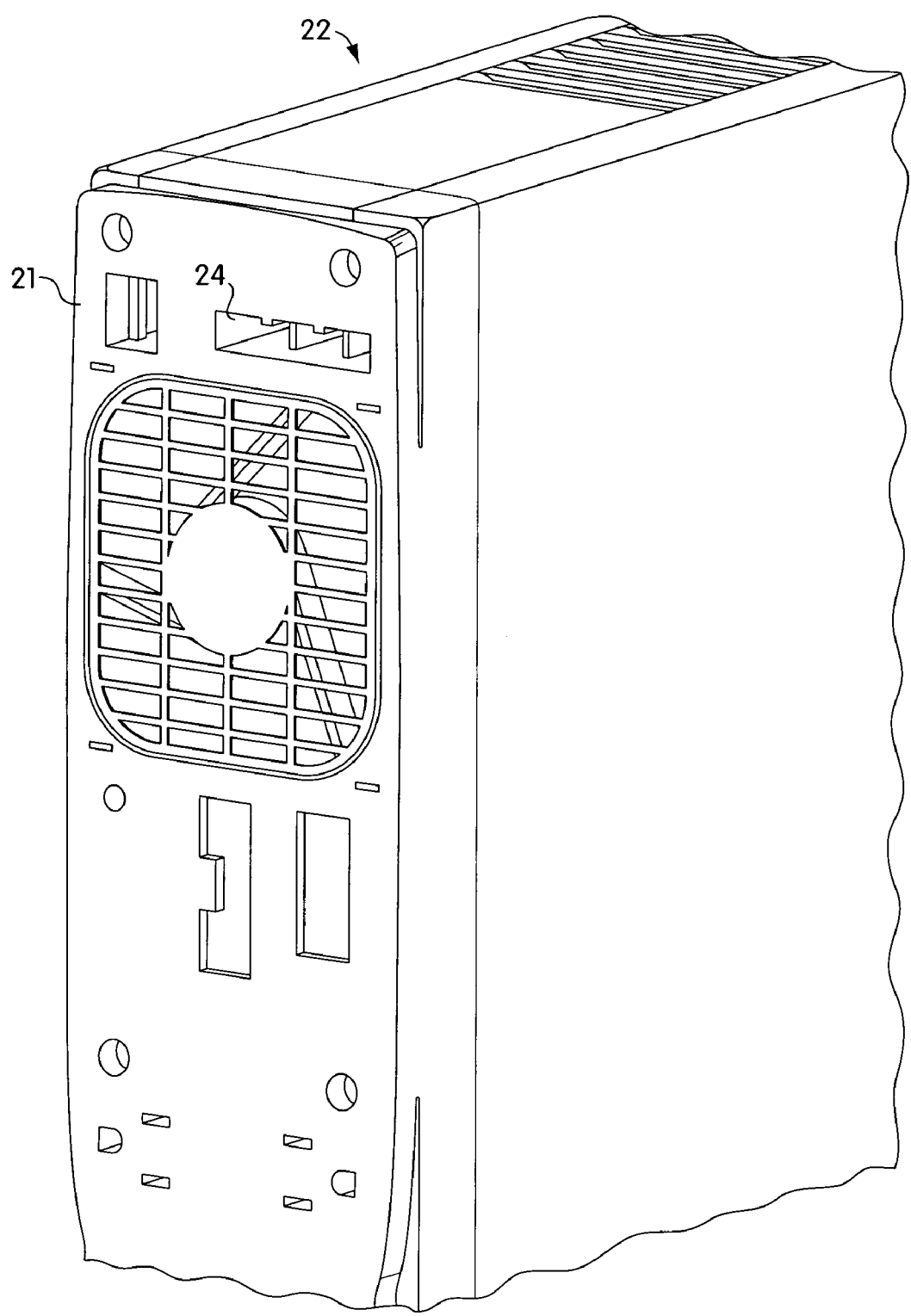
FIG. 2 is an enlarged portion of the perspective view of FIG. 1.

With reference to FIGS. 1 and 2, one embodiment of an enclosure 20 for a UPS 22 includes a battery connector 24. More specifically, the enclosure includes a female battery connector. According to the illustrated embodiment, the connector 24 is integral to the enclosure. The illustrated enclosure 20 further includes a housing 21, utility outlets 29 integral to the housing 21, and a power cord attachment 27 for passage of the power cord 23 out through the housing 21. The power cord attachment 27 can affix the power cord to the housing in a static manner or, in an alternative embodiment, it can slidably engage the power cord.

Figure 4:
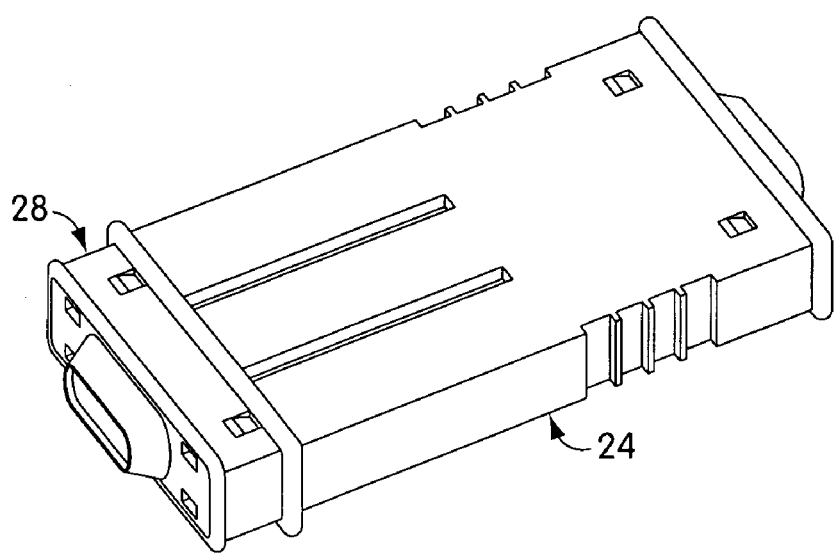
FIG. 4 is a perspective view of a male connector and a female connector associated with the battery connector of FIG. 1 where the male connector is inserted into the female connector.

With reference to FIG. 3, the female connector has an opening 26 for receiving a male connector 28 having three prongs 80, 82, 84. Indeed, FIG. 4 shows the male connector 28 fully inserted in the female connector 24. One can use this connector configuration for connection of a battery pack(s), i.e., external battery(ies), as shown in FIGS. 1 and 2, and/or for connection of a battery cartridge, i.e., internal battery (ies), as shown in FIGS. 7 and 8.

Similar to the enclosure shown in FIGS. 1 and 2, with reference to FIGS. 7 and 8, one embodiment of an enclosure 20 for a UPS 22 includes a battery connector 24 for connecting with an internal battery. More specifically, the enclosure includes a female battery connector 24. According to the illustrated embodiment, the connector 24 is integral to the enclosure 20.

Again the female connector has an opening 26 for receiving the male connector 28 (shown in FIG. 3) having three prongs 80, 82, 84. Indeed, the illustrated embodiments, i.e., the embodiments shown in FIGS. 1 and 7, use the same female connector configuration so that those responsible for the enclosure manufacture need only deal with one male connector design and one female connector design. Similar to the embodiment shown in FIG. 1, the embodiment shown in FIGS. 7 and 8 includes a housing 21, a utility outlet 29 integral to the housing, and a power cord attachment 27 integral to the housing and adapted for allowing passage of the power cord 23 out through the housing. The illustrated embodiment of the housing further includes a battery box compartment 25 and the battery connector is integral with the battery box compartment. The UPS system 22 can further include a battery box compartment door 81 for placement over the compartment once the battery is inserted in the compartment.

With reference to FIGS. 3, 5, and 6 one embodiment of a UPS system according to the invention includes a UPS 22, an internal battery 36, and a battery pack 56. The internal battery and the battery pack have connectors 28, 28' with first, second and sense pins 32, 34, 30. The UPS 22 has first second and third precharge contacts 40, 42, 38 for connecting to the first, second and sense pins 32, 34, 30, respectively, of the internal battery connector 28 and first, second, and third sensor contacts 52, 54, 50 for connecting to the first, second and sense pins 32', 34', 30', respectively, of the battery pack connector 28'.

The UPS 22 further includes a precharge circuit having a capacitor 46 with first and second leads. The first lead is coupled to the first contacts, 40, 52. The second lead is coupled to the second contacts 42, 54. The precharge circuit further includes a current limiting circuit 45 having first and second leads. The first lead is coupled to the first lead of the capacitor 46 and the second lead is coupled to the third precharge contact 38. With reference to FIG. 6, the current limiting circuit can include a diode 73 and a resistor 71 connected in series. Furthermore, the current limiting circuit could be located in the internal battery 36 which is described in greater detail below The UPS 22 further includes a battery pack sensor 67 electrically coupled to the precharge circuit 45. The battery pack sensor includes the first, second, and third sensor contacts 52, 54, 50, and a sensing circuit 65 coupled to the first and third sensor contacts. In the illustrated embodiment, the sensing circuit 65 can include a microprocessor 62 having first and second pins 91, 93. One embodiment of the invention uses an off-the-shelf microprocessor (more accurately described as a microcontroller), such as the ST72F324J6T5 available from ST Microelectronics of Lexington, Mass. The invention does not rely on a particular microcontroller—a variety of programmable controllers could be used. Alternatively, the detection and subsequent modification of unit operation could be achieved entirely without the intervention of a microcontroller (i.e. by using discrete, non-programmable hardware).

The microprocessor/microcontroller is operative to sense the presence of one or more battery packs 56. The sensing circuit 65 further includes a first resistor 66 having first and second leads. The first lead is electrically coupled to the first sensor contact 52 and the second lead is electrically coupled to the first microprocessor pin 91.

The sensing circuit 65 further includes a second resistor 68 having first and second leads. The first lead is electrically coupled to the first microprocessor pin 91. The second lead is electrically coupled to the second sensor contact 54 and the second microprocessor pin 93. The sensing circuit 65 further includes a third resistor 64 having first and second leads. The first lead is electrically coupled to a voltage source and the second lead is coupled to the first microprocessor pin 91. The sensing circuit 65 further includes a diode 69 having an input lead and output lead and a fourth resistor 48 having first and second leads. The input lead of the diode is coupled to the first pin of the microprocessor and the first lead of the fourth resistor 48 is coupled to the output of the diode and the second lead of the fourth resistor 48 is coupled to the third sensor contact 50.

In addition, the sensing circuit 67 can include a switch 70. In this case, the first resistor 66 is coupled to the first sensor contact 52 via the switch 70. Furthermore, the battery pack 56 can further include a resistor 58 such that the sense pack contact 30' is electrically coupled to the second pack contact 34' via the resistor.

In one embodiment and with reference to FIG. 6, the detection of the external battery pack works as follows:

In the illustrated embodiment of the invention, the signal that represents the number of attached external battery packs (BP), is combined with a signal that represents the state of the on/off switch 70 of the UPS. The combination is the POW_SWITCH/XL_DETECT signal 91.

The on/off switch is inherently a "digital" function, while the number of attached battery packs is converted to an "analog" voltage that is converted into digital form by the microcontroller.

The way the illustrated embodiment works is that when the on/off switch (momentary) 70 is not pushed, and there are no external battery packs, the signal is 2.5 volts. As battery packs are connected, this signal DECREASES per the table shown below (e.g., with 1 BP, it decreases to 2.19 volts, 2 BP to 1.98 volts, etc.) As one connects additional battery packs, this signal DECREASES. On the other hand, when one pushes the on/off switch 70, the signal INCREASES to 5 volts. Thus these two functions work in opposite directions in how they affect the level of this signal.

The advantage of this configuration is that there is no possibility that this system for detecting on/off switch status can be confused by how many battery packs are attached, and similarly the algorithm for detecting number of battery packs cannot be confused by the status of the on/off switch. In one embodiment of the invention, state operation of the UPS is dependent upon action of the on/off switch. For example, if a user presses the switch while the unit is in Standby state, the unit will come up to an active UPS state. Likewise, if the UPS is active, and the user switches the unit off, the UPS will go into a standby state from its active state.

As is stated elsewhere in the disclosure, sharing the same signal for two distinct functions does limit the number of battery packs that can be reliably detected in the illustrated embodiment. But one could also separate the two functions easily if necessary.

As noted above, with no battery pack, the POW_SWITCH/XL_DETECT signal 91 reads ½ of 5 VS (or 2.55 Vdc), which should be 127 or 128 AD counts. AD counts are an analog to digital conversion of the analog POW_SWITCH/XL_DETECT signal 91.

If one pushes the on/off button 70, the signal goes up to >5V (clamped by the internal diode of the micro pin).

With one external battery pack connected, the voltage drops to about 2.19V or 109 AD counts.

Additional battery packs would affect this signal the following way (nominal, not worst case):

| Num of battery packs | Signal | ADcount |
|---|---|---|
| 1 | 2.194231 | 109 |
| 2 | 1.971875 | 98 |
| 3 | 1.819737 | 90 |
| 4 | 1.709091 | 85 |
| 5 | 1.625 | 81 |
| 6 | 1.558929 | 77 |
| 7 | 1.505645 | 75 |
| 8 | 1.461765 | 73 |
| 9 | 1.425 | 71 |

-continued

| Num of battery packs | Signal | ADcount |
|---|---|---|
| 10 | 1.39375 | 69 |
| 11 | 1.36686 | 68 |

In the table above ADcount represents an analog to digital conversion of the analog POW_SWITCH/XL_DETECT signal listed in the middle column. Depending on tolerances, up to about 3 or 4 battery packs can be reliably detected (AD counts differ by at least 5 counts). This signal is independent of the battery voltage, which is an advantage. Battery voltage varies widely depending on the state of charge, such wide variation would overshadow the small difference between successive signal levels to represent the number of packs. So a regulated constant voltage is used to feed the resistor divider network that represents the internal circuit plus the connection of external battery packs. The same regulated constant voltage is used to drive the analog to digital converter reference voltage. So the voltage ratio becomes a ratio of the equivalent resistance set up by the resistor divider network and becomes independent of the voltage.

Using the regulated constant voltage for the analog to digital converter reference voltage, and then using the unregulated battery voltage to drive the resistor network, requires taking an additional measurement of a scaled down battery voltage and performing additional computations to factor out the variability of this measured battery voltage. The scaling and computations would be subject to additional component and rounding errors, and would consume additional microcontroller time to the embodiment described above.

If it is necessary to detect a greater number of battery packs, a dedicated analog input pin can be used for this purpose, and one can then use the full range of the AD count. Since the power switch is a "digital" function, and the XL_DETECT is an analog function, and since these signals work in opposite directions, this configuration minimizes any possibility of malfunction of the firmware or the hardware as a result of noise or glitches.

The fourth resistor 48 in FIG. 6 in series with the battery pack sense wire prevents harmful spikes from causing malfunction in the sensing circuit 65. Also it limits the current should the sense wire be pulled below ground for any reason.

This scheme, unlike some previous methods, does not cause malfunction or potential damage if the wrong battery is connected. The diodes on the sense pin prevent currents from flowing in the wrong direction.

As noted above, battery connectors often exhibit sparking and deterioration of the battery connection terminals due to the large internal UPS capacitors needed for UPS operation. To address this sparking and deterioration, in the illustrated embodiment, the middle pin 32 (connected to battery positive 33) of the three-pin connector 28 for the internal battery 36 is slightly recessed. However, in an alternative embodiment, the recess could exist on the UPS side. The recess allows time for a controlled resistive current limited capacitor precharge during the mating of the connectors. A controlled charge to a specified voltage, followed by battery connection, is successful in reducing spark and deterioration.

For example, applying a 22 VDC potential to a 5 ohm R_Charge coupled with 6600 uF of capacitance sufficiently charges the capacitors in about 0.055 seconds. Applying the same potential to a 5 ohm R_Charge sufficiently charges 4400 uF in about 0.037 seconds.

As noted above, this delay can be accomplished by mechanically recessing the middle pin, connected to battery positive, to allow for this brief delay in a normal connection of the UPS battery.

The range for the amount that the first pin is recessed depends on several factors. Excessive recess is not desirable on a high current connection as the recess reduces the contact surface area. Minimum range is determined by the minimum precharge time for the capacitor. The precharge time is a function of the capacitor value, the resistor value, and the resistor wattage. Choosing a larger, higher wattage (and lower resistance) resistor allows a faster precharge. In the illustrated embodiment of FIG. 5, the mechanical design of the contacts, e.g., contacts 38, 40, 42, has a mechanism 97, e.g., a slight bump, in the shell 95 at the location of the first contact point. This design provides a pause in the insertion speed at the moment of precharge, which slows the connection insertion and allows sufficient precharge time with a smaller physical resistor wattage size.

Alternatively or in addition, with reference to FIGS. 3 and 9, in one embodiment prongs, e.g., 80, 84, of the male connector have a mechanism, e.g., a depressible tab or tongue 99 extending out from the side of the prong at a slight angle, adapted to slow the progress of the male connector 28 into the female connector 24 to allow time for precharging of the capacitor (preventing the occurrence of sparking during connection). The tab or tongue 99 can include an extension 93 at an appropriate location to ensure that the insertion of the male connector into the female connector pauses once the precharge contact is made but prior to when the first contact (the direct battery positive contact) is made.

Returning to a discussion of the extra battery pack 56 (an optional battery module that is placed next to the UPS) one can use the same connector that one uses for the internal battery to connect the battery pack to the UPS. However, in this case, the third pin is used to sense the presence of the battery pack, something difficult to do directly with a two pin connector (the UPS would otherwise have to indirectly deduce the presence of the battery pack by measuring the battery DC voltage vs. load during battery runtime). With the three pin connector, sensing the battery pack would be easier by measuring R_Sense via the third pin.

In one embodiment, the battery pack and the UPS satisfy a "Dark Current" design standard. According to one Dark Current design standard, one measures the battery current when the unit is off and the battery current should be zero or low enough to ensure that the UPS system will be able to withstand storage for 1 year without damage. One can meet this standard by connecting the resistor to the negative lead of the battery pack, or by connecting it to the positive lead and having enough impedance (R_Series) in the UPS to satisfy the design standard.

Embodiments of the invention advantageously provide a safe connection should the user inadvertently connect the Extra battery pack to the connector meant for the internal UPS battery, their connectors being the same.

A feature of this extra battery sense is that, should the product allow multiple battery packs, the UPS senses the amount of parallel resistance R_Sense in the battery packs, regardless of whether they are daisy chained (the rightmost terminals in the Extra battery pack shown in FIG. 5 represent a daisy chain connection method) or tied in parallel directly to the UPS (for example, via a Y-connector arrangement). More specifically and with reference to FIG. 5, battery pack 56 has a first additional pack contact 61 electrically coupled to the first pack contact 32', a second additional pack contact 63 electrically coupled to the second pack contact 34', and a sense contact 60 of the additional pack electrically coupled to the sense contact 30' of the pack.

Returning to a discussion of the connector in general, embodiments of the invention use one style of connector for both capacitor precharge (from the UPS internal battery pack) and for Extra battery pack sense (of an External battery pack). As a consequence, one embodiment of a UPS according to the invention can use a plurality of connectors all of the same type and have both internal batteries and an optional extra battery pack for extended run time.

Advantageous aspects of the invention include: having a connector design that satisfies the need of capacitor precharge for the main UPS battery by use of a third pin, and on a separate connector to an external battery pack employing the same design of connector; utilizing a third pin position to sense the presence of the external battery pack by the UPS processor; using inexpensive and readily available Fast-On connector contacts in the connector design; and allowing for adequate precharge time by inserting a mechanical stop in the connector shell. As stated above, in one embodiment the precharge of the internal bulk cap by the internal battery is accomplished by offsetting the male connectors.

With reference to FIGS. 1, 3 and 7, another advantage of the invention is provided by the integration of the battery connection with the housing 21 of the UPS enclosure. The integrated battery connection is a user-friendly design in that there is only one part the end user is required to handle when connecting the battery pack to the main UPS unit. The end user need only grasp and connect the battery pack connector, i.e., the male connector 28, into the integrated battery pack connector 24 in the housing (21 in FIG. 1) or the battery box compartment (25 in FIG. 7).

Due to the fact that the mating connection can be integrated via plastic injection molding into the main battery compartment of the UPS there is no need for the end user to handle two distinct parts together to make the connection for the battery pack. In one embodiment, the mating connector can be integrated and plastic injection molded into the actual battery box compartment 25 of the main UPS assembly. The end user simply takes the connector of the battery pack and inserts it into the mating portion of the connector in the battery box compartment to make the final connection for the battery pack.

Embodiments of the invention reduce the number of overall parts in the mechanical enclosure, and make it easier and more convenient for the end user to make the battery pack connection to the main UPS. Reducing the part count reduces inventory and the final cost of the design.

In one embodiment, the battery pack connector can be fully plastic injection molded and integrated into the battery box compartment part of the main plastic enclosure. Such integration makes the initial connection as well as the replacement battery pack connection of the battery pack easy for the consumer and or end user to the main UPS unit and makes for an effective connection of the battery pack without the use of any tools.

Previous battery pack connection designs utilize multiple connectors that are difficult to manipulate, handle and attach to the main UPS unit. Many of these connectors are sourced from third parties resulting in additional cost and loss of control for the manufacturer.

Having thus described at least one illustrative embodiment of the invention, various alterations, modifications and improvements are contemplated by the invention. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. An uninterruptible power supply comprising:
   a precharge circuit including:
      a first precharge contact;
      a capacitor having first and second leads, the first lead electrically coupled to the first contact;
      a second precharge contact electrically coupled to the second lead of the capacitor;
      a current limiting circuit having first and second leads, the first lead of the current limiting circuit electrically coupled to the first lead of the capacitor; and
      a third precharge contact electrically coupled to the second lead of the current limiting circuit;
   a battery pack sensor electrically coupled to the precharge circuit, the sensor operative to sense the presence of an extra battery pack; and
   a battery cartridge having a battery with positive and negative terminals, a first cartridge contact coupled to the positive terminal of the battery and adapted for mating with the first precharge contact, a second cartridge contact coupled to the negative terminal of the battery and adapted for mating with the second precharge contact, and a third cartridge contact electrically coupled to the first cartridge contact, the third cartridge contact adapted for mating with the third precharge contact, at least one of the first cartridge contact and the first precharge contact being recessed relative to the third cartridge contact and the third precharge contact, respectively, such that the capacitor is precharged through the third cartridge contact prior to full electrical contact between the first cartridge contact and the first precharge contact.

2. The UPS of claim 1 wherein the UPS further comprises an enclosure including
   a housing; and
   a battery connector integral to the housing, the battery connector adapted to house the first, second and third precharge contacts.

3. The UPS of claim 1 wherein the UPS further comprises a mechanism associated with at least one of the first, second, and third precharge contacts and operative to slow completion of an electrical connection between the cartridge contacts and the precharge contacts to allow adequate time for precharging the capacitor.

4. The UPS of claim 3 wherein the mechanism is a protrusion at a first contact point between a precharge circuit contact and a battery cartridge contact.

5. The UPS of claim 1 wherein the battery cartridge further comprises
   a male connector; and
   a mechanism coupled to the male connector and operative to slow completion of an electrical connection between the cartridge contacts and the precharge contacts to allow adequate time for precharging the capacitor.

6. The UPS of claim 5 wherein the male connector comprises first, second, and third prongs operative to house the first, second, and third cartridge contacts, respectively, and wherein at least one of the prongs comprises a depressible tongue extending out from the side of the prong at an angle, the tongue including an extension operative to ensure that the insertion of the male connector into the female connector pauses once the precharge contact is made but prior to when the first contact is made.

7. An uninterruptible power supply comprising:
   a precharge circuit including:
      a first precharge contact;
      a capacitor having first and second leads the first lead electrically coupled to the first contact;
      a second precharge contact electrically coupled to the second lead of the capacitor;
      a current limiting circuit having first and second leads the first lead of the current limiting circuit electrically coupled to the first lead of the capacitor; and
      a third precharge contact electrically coupled to the second lead of the current limiting circuit; and
   a battery pack sensor electrically coupled to the precharge circuit the sensor operative to sense the presence of an extra battery pack;
   wherein the battery pack sensor comprises:
      a first sensor contact electrically coupled to the first precharge contact;
      a second sensor contact electrically coupled to the second precharge contact;
      a third sensor contact; and
      a sensing circuit electrically coupled to the third sensor contact and to the first sensor contact;
   wherein the sensing circuit comprises:
      a microprocessor having first and second pins, the microprocessor operative to sense the presence of a battery pack;
      a first resistor having first and second leads, the first lead electrically coupled to the first sensor contact and the second lead electrically coupled to the first microprocessor pin;
      a second resistor having first and second leads, the first lead electrically coupled to the first microprocessor pin and the second lead electrically coupled to the second sensor contact;
      a third resistor having first and second leads, the first lead electrically coupled to a voltage source and the second lead electrically coupled to the first microprocessor pin;
      a diode having an input lead and an output lead, the input lead electrically coupled to the first microprocessor pin; and
      a fourth resistor having first and second leads, the first lead electrically coupled to the output lead of the diode and the second lead electrically coupled to the third sensor contact.

8. The UPS of claim 7 wherein the sensing circuit further comprises a switch and wherein the first resistor is electrically coupled to the first sensor contact via the switch.

9. An uninterruptible power supply comprising:
   a precharge circuit including:
      a first precharge contact;
      a capacitor having first and second leads the first lead electrically coupled to the first contact;
      a second precharge contact electrically coupled to the second lead of the capacitor;
      a current limiting circuit having first and second leads the first lead of the current limiting circuit electrically coupled to the first lead of the capacitor; and
      a third precharge contact electrically coupled to the second lead of the current limiting circuit; and a battery pack sensor electrically coupled to the precharge circuit the sensor operative to sense the presence of an extra battery pack, wherein the battery pack sensor comprises a first sensor contact electrically coupled to the first precharge contact a second sensor contact electrically coupled to the second precharge contact a third sensor contact a sensing circuit electrically coupled to the third sensor contact and to the first sensor contact; and a battery pack including a battery having a positive terminal and a negative terminal, a first pack contact electrically coupled to the battery positive terminal and adapted for mating with the first sensor contact, a second pack contact electrically coupled to the battery negative terminal and adapted for mating with the second sensor contact, a sense pack contact electrically coupled to the second pack contact and adapted for mating with the third sensor contact of the sensor.

10. The UPS of claim 9 wherein the battery pack further comprises a resistor and the sense pack contact is electrically coupled to the second pack contact via the resistor.

11. The UPS of claim 9 wherein the battery pack further comprises an additional pack connector having a first additional pack contact electrically coupled to the first pack contact, a second additional pack contact electrically coupled to the second pack contact, and sense additional pack contact electrically coupled to the sense pack contact.

12. An uninterruptible power supply (UPS) comprising:
precharge means including:
a first precharge contact; and
a charge storage element having first and second leads the first lead electrically coupled to the first precharge contact;
the precharge means for precharging the charge storage element prior to full electrical contact between a battery cartridge and the first precharge contact; and
battery pack sensor means electrically coupled to the precharge circuit the sensor means for sensing the presence of an extra battery pack;

wherein the battery pack sensor means comprises:
a first sensor contact electrically coupled to the first precharge contact;
a second sensor contact electrically coupled to the second precharge contact;
a third sensor contact; and
a sensing circuit electrically coupled to the third sensor contact and to the first sensor contact;

wherein the sensing circuit comprises:
a microprocessor having first and second pins, the microprocessor operative to sense the presence of a battery pack;
a first resistor having first and second leads, the first lead electrically coupled to the first sensor contact and the second lead electrically coupled to the first microprocessor pin;
a second resistor having first and second leads, the first lead electrically coupled to the first microprocessor pin and the second lead electrically coupled to the second sensor contact;
a third resistor having first and second leads, the first lead electrically coupled to a voltage source and the second lead electrically coupled to the first microprocessor pin;
a diode having an input lead and an output lead, the input lead electrically coupled to the first microprocessor pin; and
a fourth resistor having first and second leads, the first lead electrically coupled to the output lead of the diode and the second lead electrically coupled to the third sensor contact.

13. The UPS of claim 12 wherein the sensing circuit further comprises a switch and wherein the first resistor is electrically coupled to the first sensor contact via the switch.

\* \* \* \* \*